Aug. 8, 1950     F. A. MULLER     2,517,589
MEASURING APPARATUS

Filed June 30, 1945

INVENTOR.
Fred A. Muller
BY
ATTORNEY

Patented Aug. 8, 1950

2,517,589

UNITED STATES PATENT OFFICE 2,517,589

MEASURING APPARATUS

Fred A. Muller, Newark, N. J., assignor to Federal Telephone and Radio Corporation, New York, N. Y., a corporation of Delaware Application June 30, 1945, Serial No. 602,452

9 Claims. (Cl. 175—183)

This invention relates to measuring apparatus, and more particularly to a method of and means for measuring the electrical length of coaxial lines, such as high frequency coaxial cables.

An object of this invention is to provide a method of and means for simply and accurately determining the relative electrical lengths of different coaxial wave guides or cables.

Another object of this invention is to provide a method and means by which the difference between the electrical length of a high frequency line or cable of unknown length and the electrical length of a similar high frequency line or cable of known length can be directly measured in lineal units.

Figure 1:
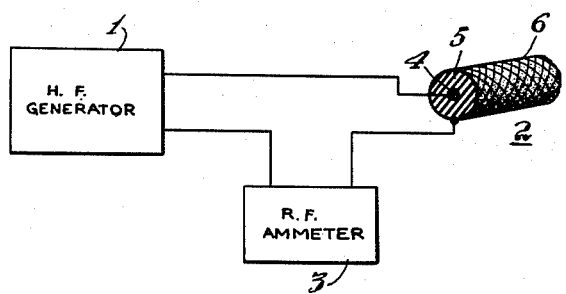
Figure 2:
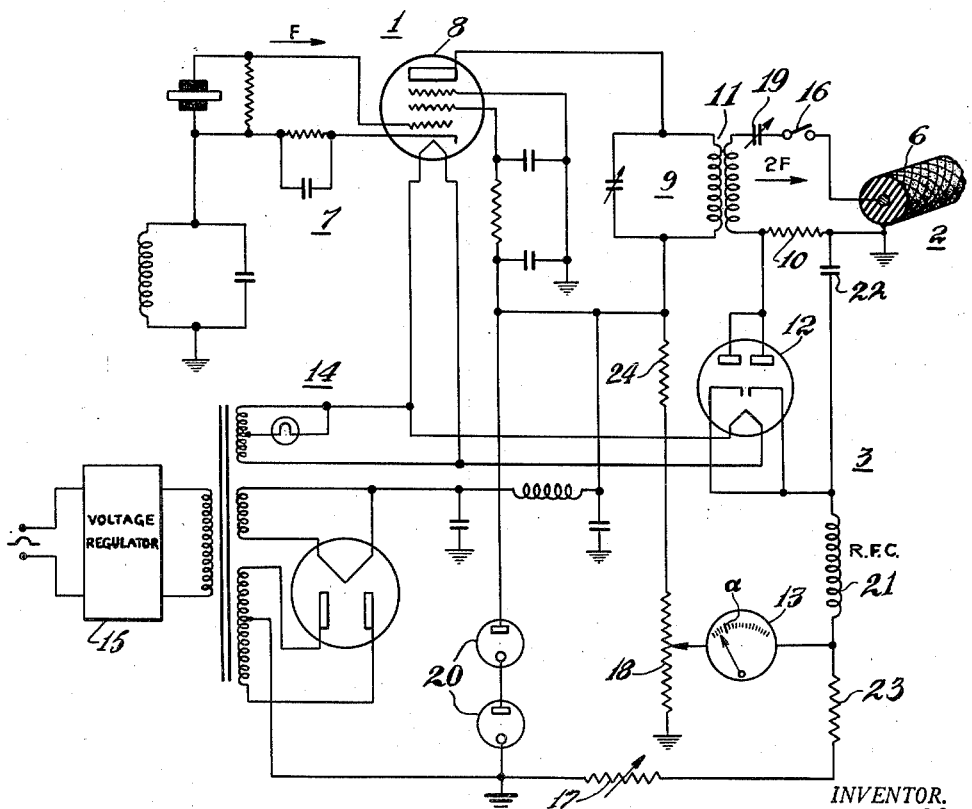

Other objects will appear from the following description of an illustrative embodiment of the invention taken together with the attached drawings wherein:

Fig. 1 is a block circuit diagram illustrating the general circuit arrangement of the measuring apparatus in accordance with the present invention; and Fig. 2 is a detailed circuit diagram illustrating, by way of example, a preferred embodiment of the invention.

As seen in Fig. 1, the apparatus comprehends the use of a high frequency generator 1 connected to a cable or line 2 through a circuit including a high or radio frequency ammeter indicated at 3. The cable under test may be of the usual type including a center conductor 4 surrounded by insulation 5, in turn surrounded by an outer conductor in the form of a braid 6.

Turning now to Fig. 2 for a more comprehensive circuit diagram of the general circuit outlined in Fig. 1, as a preferred form of the invention it is contemplated that the high frequency generator 1 may consist of a crystal oscillator circuit 7 including a vacuum tube 8 whose output is connected to a tuned circuit 9 which preferably, but not necessarily, is tuned to the second harmonic of the generator frequency. In this manner the high frequencies desired for use in testing and measuring the cable can readily be obtained. In a specific example of the measuring apparatus as used, the crystal and its associated oscillator are adapted to oscillate at 14.25 megacycles, and the frequency of the current applied to the cable will, therefore, be 28.5 megacycles. In Fig. 2, this frequency doubling is indicated by the reference characters F associated with the oscillator circuit and 2F associated with the input circuit to the cable.

The input circuit to the cable 2 includes a resistor 10 and impedance elements so chosen relatively to the frequency that the current flowing through this resistor varies rapidly with changes in the electrical length of the cable. These impedance elements include the secondary of a coupling transformer 11, the primary of which forms the inductive element of the tuned circuit 9, as well as the variable condenser 19. When the cable is open- or short-circuited or terminated in a reactance, so as to have substantially unity reflection, its input impedance will constitute a reactance varying from capacitively infinite through zero to inductively infinite with each halfwave-length of cable added. Somewhere between these extremes there will be a series resonant condition with the circuit elements 11 and 19, corresponding to a current antinode through the circuit 10, 11, 19 and 2, and through suitable adjustment of condenser 19 the tuning of this circuit may be modified so that, within the desired measuring range, the current through resistor 10 will be at some intermediate value varying rapidly with deviations of the electrical length of the cable 2 from a given norm. The voltage drop across the resistor 10 is a measure of the current flowing in this circuit and through the use of the radio frequency ammeter 3 may, in accordance with the present invention be directly transformed into electrical length measurements. For this purpose the ammeter circuit 3 preferably includes a rectifier such as a double diode 12 connected in shunt in a high frequency circuit with the resistor 10. The rectified current after passing through a suitable radio frequency choke 21, grounded for high frequencies through condenser 22, is applied to a milliammeter 13 from the cathode of the diode, the direct current circuit being completed by grounding the other side of the meter and grounding the outer conductor of the cable, as indicated. Operating power for the vacuum tubes is supplied through a suitable rectified power source 14 of known design, the output to which is preferably controlled through a voltage regulator indicated at 15. In this manner a regulated power supply is obtained so that there will be no fluctuations in the constants of the power source. Two gas filled tubes 20 are connected in series across the power supply 14 to serve as a voltage stabilising means.

In carrying out the measuring method with the above apparatus and in accordance with the present invention, a cable or line of known electrical length is attached to the coupling circuit as shown in Fig. 2. The switch 16 is closed and some reading will be obtained on the meter 13.

In order to assure a proper scale spread, the resistor 17 in series with a fixed resistance 23 will be adjusted until this is obtained. By adjustment of the potentiometer 18 a null point "a" is then determined on the meter and this null point will preferably be somewhere between the extremes of the scale. The potentiometer 18 is connected to the positive terminal of the power supply 14 by way of a fixed resistor 24.

The switch 16 is then opened and a cable of unknown electrical length is attached to the coupling circuit. Upon closure of the switch 16 another reading will be obtained on the meter 13 which in all probability will be to one side or the other of the null point predetermined from the test piece of known electrical length. By suitable calibration of the meter 13 the departure of the meter needle from the null point may be indicated in lineal units such as inches and fractions of an inch whereby, knowing the electrical length desired, the amount of departure from this desired length of the cables of unknown length can be read directly. In those cases where the cable under test is too long it can be trimmed to size in accordance with the direct reading on the meter 13 and no calculations are necessary, as is true in apparatus heretofore proposed.

The circuit described above and the method followed can, by proper variation of circuit constants be applied to the testing of cables or wave guides over a wide range of high frequencies. Obvious variation in detail of the apparatus will be apparent to those skilled in this art and are contemplated as falling within the scope of the present invention. For example, the basic oscillator illustrated can be supplanted by other suitable oscillators operating at a constant frequency. As pointed out above, a frequency doubler arrangement is not essential but has been used merely as a convenient manner for obtaining the high frequencies applied for test purposes.

The power supply for the tubes can be of any usual type provided only, that variations therein be kept to a minimum.

Accordingly, while I have described above the principles of my invention in connection with certain specific apparatus, it is to be clearly understood that this description is made only by way of example, and not as a limitation of the scope of my invention as set forth in the objects and the accompanying claims.

What I claim is:

1. Apparatus for measuring the relative electrical lengths of transmission lines comprising a high frequency power source, a circuit coupled to the output of said power source including an adjustable tunable reactive impedance means and a resistor whereby current through said resistor may be adjusted to a value less than maximum, means for connecting said circuit across the input terminals of a line to be tested, and means connected across said resistor for measuring the magnitude of the voltage thereacross representative of the magnitude of the current flowing in said circuit when connected to said line to be tested.

2. Apparatus according to claim 1, wherein the means for measuring the magnitude of said voltage include a rectifier connected across said resistor, and means for filtering out the high frequency components of the rectified voltage.

3. Apparatus according to claim 2, wherein said measuring means further include an ammeter in series with said rectifier.

4. Apparatus according to claim 3, in combination with means for varying the scale spread of said ammeter and means for setting said ammeter at a predetermined point when connected to a transmission line of known electrical length.

5. Apparatus according to claim 1, wherein said reactive impedance means include an inductance coil electromagnetically coupled to the inductive element of a tuned circuit incorporated in said power source.

6. Apparatus according to claim 5, wherein said reactive impedance means further include an adjustable condenser in series with said inductance coil.

7. Apparatus for measuring the deviation of the electrical length of a two-conductor transmission line from that of a similar line serving as a standard, comprising a high frequency power source, means for stabilizing the frequency of said source, means for stabilizing the output voltage of said source, a circuit coupled to the output of said source including a tunable reactive impedance means and a resistor, means for connecting said circuit across one end of a line to be tested, an adjustable reactance in said circuit whereby the current through the resistor may be adjusted to a value less than its maximum when the latter is connected to said standard line, means for rectifying the voltage across said resistor, and means for measuring the magnitude of said rectified voltage.

8. Apparatus according to claim 7, wherein said last means include an ammeter calibrated in lineal units, means for varying the scale spread of said ammeter, and means for setting said ammeter at a predetermined point when connected to the said standard line.

9. Apparatus according to claim 7, wherein said tunable means includes an adjustable condenser and the secondary of a transformer the primary of which is included in an oscillatory circuit forming part of said power source.

FRED A. MULLER.

REFERENCES CITED

The following references are of record in the file of this patent:

UNITED STATES PATENTS

| Number | Name | Date |
|---|---|---|
| 2,120,391 | Butterfield | June 14, 1938 |
| 2,188,588 | Antranikian | Jan. 30, 1940 |
| 2,421,420 | Hathoway | June 3, 1947 |

OTHER REFERENCES

Electronics, October 1945, pages 130–134.

Bialous et al., General Electric Review, May 1941, pages 263–266.

Negaard, A Survey of Ultra-High-Frequency Measurements, reprint from RCA Review, Oct. 1938, pages 190–192.